United States Patent [19]
Hasegawa
[11] 3,810,244
[45] May 7, 1974

[54] CROSS TYPE MAGNETIC HEAD

[75] Inventor: Tachio Hasegawa, Chichibu, Japan
[73] Assignee: Canon Kabushiki Kaisha, Tokyo, and Canon Denski Kabushiki Kaisha, Chichibu-shi, both of Japan

[22] Filed: Sept. 10, 1971
[21] Appl. No.: 179,285

[30] Foreign Application Priority Data
Sept. 14, 1970 Japan ............................... 45/80712
Sept. 14, 1970 Japan ............................... 45/80711

[52] U.S. Cl. ...............................360/118, 360/125
[51] Int. Cl. ............................................... G11b 5/26
[58] Field of Search .............. 179/100.2 C, 100.2 D; 340/174.1 F; 346/74 MC

[56] References Cited
UNITED STATES PATENTS
3,562,443 2/1971 Bos .............................. 179/100.2 D
3,485,958 12/1969 Bos et al. .................... 179/100.2 D
3,013,123 12/1961 Camras ....................... 179/100.2 C

*Primary Examiner*—Terrell W. Fears
*Attorney, Agent, or Firm*—Raymond J. McElhannon et al.

[57] ABSTRACT

A cross type magnetic head of the present invention includes a magnetic record or record-reproduce head core and an erase head core. The magnetic record or record-reproduce head core consists of a pair of magnetic record or record-reproduce head core members fixed to each other in side-to-side abutting relationship so as to form a front gap. The erase head core consists of a pair of erase head core members of high magnetic resistance and high magnetic permeability disposed so as to cross the magnetic record or record-reproduce head core in the vicinity of the front gap. Thus, erased tracks can be formed along the opposite side edges of a magnetized recorded track provided by the magnetic record or record-reproduce head core.

8 Claims, 12 Drawing Figures

CROSS TYPE MAGNETIC HEAD

BACKGROUND OF THE INVENTION

1. Field of the Invention

This invention relates to a cross type magnetic head, and more particularly to such magnetic head in which a pair of erase head core members are disposed on and in crossed relationship with a magnetic record or record-reproduce head core at the opposite sides thereof adjacent to the surface of the latter head core adapted to contact with a magnetic recording medium.

2 Description of the Prior Art

The improved recording characteristic of magnetic recording media has given rise to the demand for recording information or data very densely on the recording media.

In order to form magnetized tracks very densely on a magnetic recording medium such as magnetic tape, magnetic drum or magnetic disc and have a great deal of data recorded or reproduced on such recording medium, highly accurate position control must be effected on a magnetic head relative to the effective recording area of the magnetic recording medium. That is, in order to form a number of magnetized tracks very densely within a limited width of the recording medium and reproduce the information recorded on these tracks, the magnetic head must initially be positioned highly accurately in a direction perpendicular to the direction of movement of the magnetic recording medium and thereafter the relative position of the magnetic head or the magnetic recording medium must be varied successively without any error.

If a first one of the magnetized recording tracks formed by the magnetic head should fail to be accurately positioned, the succeeding numerous such tracks would be cumulatively deviated widthwise of the recording medium so that highly dense magnetic records could not be achieved. Such a positional deviation would further cause an error of the relative position between the magnetic head and the magnetized recorded tracks on the magnetic recording medium, and this would also lead to a result that the magnetic head will only partially or sometimes never trace a particular magnetized track to be reproduced and accordingly will reproduce any residual noise or other part of the information than that to be reproduced. Such noise reproduction resulting from the erroneous tracing by the magnetic head will become a fatal drawback, particularly in the use of an electronic computer whose storage is destined to deal with highly dense information.

A first attempt that has heretofore been made to overcome such a drawback is a method whereby the gap portions of the erase head are disposed on the opposite sides of the magnetic record-reproduce head and orthogonally to the direction of movement of the magnetic recording medium. In other words, the magnetic head provided by this method has been such that the gap of the magnetic record-reproduce head and the gaps of the erase head are disposed parallel to each other. Such an arrangement, however, has a disadvantage that the gaps of the erase head have a greater gap height than the maximum possible positioning error for a limited track width adopted for high-density recording. That is, according to this method, certain difficulties have been encountered in the course of manufacture and caused the gap of the erase head to be wider than necessary. Moreover, the magnetic head thus constructed has suffered from an operational disadvantage that the magnetic field produced in the gaps of the erase head affects the magnetic field produced in the gap of the magnetic record-reproduce head, thus resulting in undesirable mutual interference therebetween.

To reduce such mutual interference, a second method has been proposed as disclosed in "IBM Technical Disclosure Bulletin" Vol. 8, No. 2, July 1965, p. 220. According to this bulletin, an erase head core is disposed on the opposite sides of a magnetic record-reproduce head core with the gap portions of the former core being parallel to the direction of movement of the magnetic recording medium but perpendicular to the gap of the latter head core, so that magnetized recorded tracks may be formed by the magnetic head while the opposite side edge portions of each magnetized track exceeding the required track width may be erased by the erase head. With this method, since the erase flux is transverse to the recorded track of data, the influence of the former on the latter is minimized.

Nevertheless, such a combined magnetic head has a disadvantage that it is cumbersome to mount a single erase head accurately on the opposite sides of a magnetic record-reproduce head. Further, the fact that a high-density recording or reproducing operation necessarily requires the gap height of each head to be so small as to provide very narrow tracks makes it quite difficult to manufacture and mount such erase head. Also, from the viewpoint of function, leakage fluxes from the opposite ends of the erase core adjacent to the ends of the rectangular erase gap intersect the recorded track obliquely, and this would cause undesirable false gaps at the opposite end portions of the erase gap. Furthermore, such configuration of the magnetic head that the erase core is not orthogonal to the magnetic record-reproduce core but inserted over the latter core so as to embrace the same may result in an adverse effect that the magnetic path directed toward the front end of the erase core interferes with the magnetic path of the record-reproduce core.

A third method heretofore proposed is disclosed in Japanese Patent Publication No. 17679/1969 and corresponding U.S. Pat. No. 3,562,443. According to this method, an erase head core is attached integrally to a magnetic record-reproduce head core at the opposite sides thereof in such a manner that the erase gaps are disposed at an angle between 0° and 90° with respect to the tracing direction of the magnetic head. This method, however, involves much difficulty in forming the erase head gaps obliquely to the magnetic record-reproduce head, and in addition, the erase head gaps formed obliquely with respect to the magnetic record-reproduce head cause erased tracks of unnecessarily great width to be formed along the opposite side edges of a magnetized recorded track. Moreover, scuh erased tracks may be reproduced by the magnetic record-reproduce head to thereby produce some other noises. Thus, the third method proposed can neither be sufficiently satisfactory.

SUMMARY OF THE INVENTION

It is an object of the present invention to provide a novel cross type magnetic head which has eliminated the disadvantages or drawbacks as noted above with respect to the magnetic heads of the prior art.

It is another object of the present invention to provede a cross type magnetic head in which a pair of erase head core members are disposed on the opposite sides of a magnetic record or record-reproduce head core adjacent to the surface thereof which is adapted for contact with a magnetic recording medium, and in crossed relationship with the latter head core.

It is still another object of the present invention to provide a cross type magnetic head in which an erase head core for producing an erase flux in a direction for allowing no interference with a record or record-reproduce flux provided by a magnetic record or record-reproduce head core is disposed on the opposite sides of the latter head core adjacent to the front face thereof.

It is yet another object of the present invention to provide a cross type magnetic head in which a pair of erase head core members having fillers of high magnetic resistance embedded therein for enhanced erasing characteristic are disposed on the front opposite sides of a magnetic record or record-reproduce head core in crossed relationship therewith.

It is another object of the present invention to provide a cross type magnetic head in which an erase core, comprising a first pair of erase core tips having a spacer held directly therebetween to minimize the surface area of the erase head core for contact with a magnetic recording medium and a second pair of erase head core members carrying theron the erase core tips and having coils wound thereon, is disposed on the opposite sides of a magnetic record or record-reproduce head core in crossed relationship therewith.

It is another object of the present invention to provide a cross type magnetic head in which erase gaps having a width gradually increasing or decreasing in a direction in which a magnetic recording medium is traced are disposed on the opposite sides of a magnetic record or record-reproduce head core to thereby enable DC or AC erasing.

In the cross type magnetic head according to the present invention, the pair of core members constituting the magnetic record or record-reproduce head core are formed of a magnetic material of high magnetic resistance and high magnetic permeability. The interface of these two core members is filled with molten glass to form an intervening glass layer serving as a spacer member which also provides a front gap. The erase head core also consists of a pair of erase head core members of high magnetic resistance and high magnetic permeability. These two erase head core members are disposed substantially diagonally to the magnetic record or record-reproduce core in the vicinity of the front gap thereof. The materials forming the respective cores and the method of shaping such cores will be described in detail hereunder.

Other objects and features of the present invention will become apparent from the following detailed description of some specific embodiments thereof taken in conjunction with the accompanying drawings.

DESCRIPTION OF THE PREFERRED EMBODIMENTS

Figures 1, 2, 3, 4:
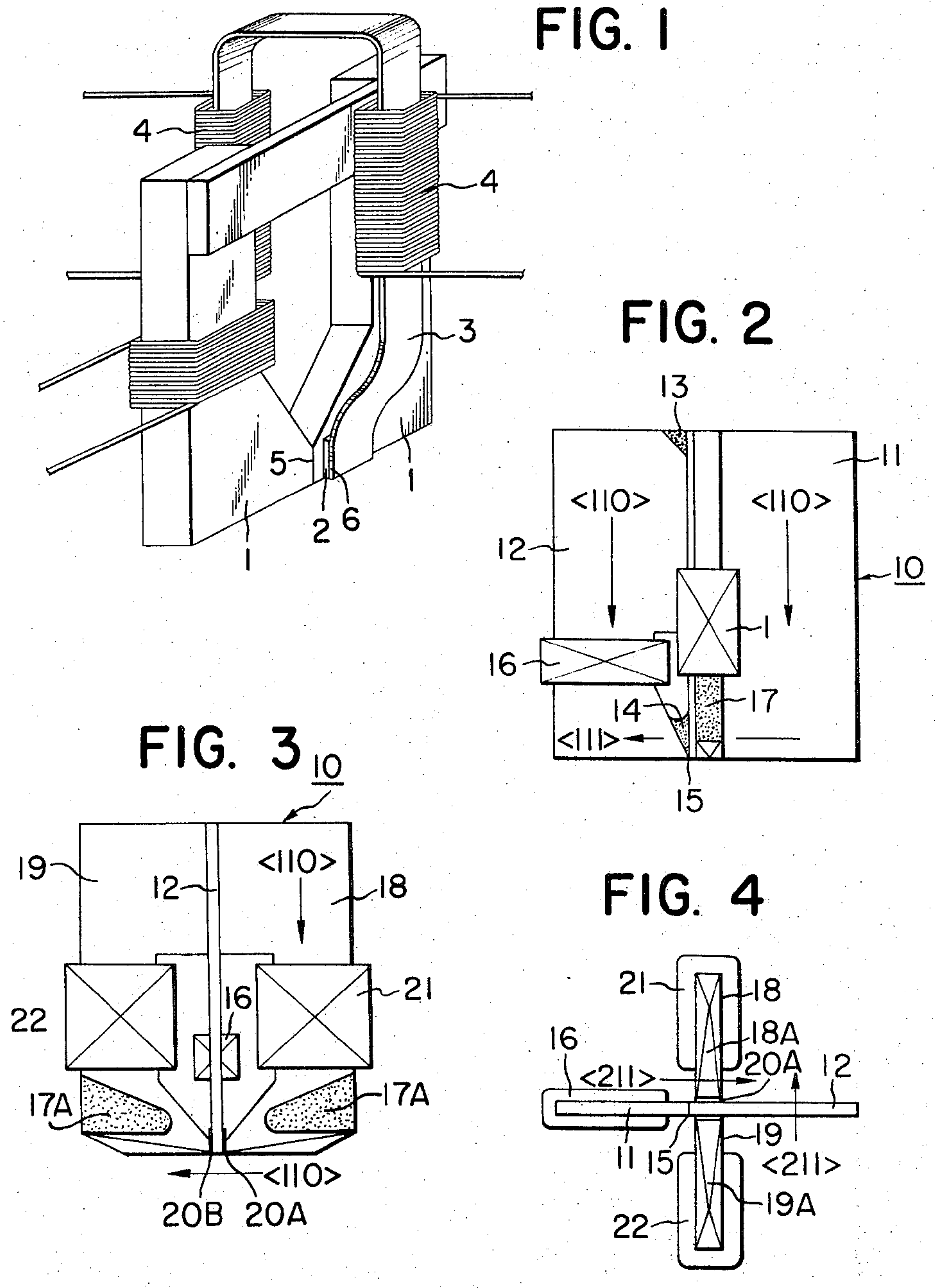
FIG. 1 is a perspective view of a combined magnetic head according to the prior art.
FIG. 2 is a front elevation of the cross type magnetic head according to an embodiment of the present invention.
FIG. 3 is a side elevation of the magnetic head shown in FIG. 2.
FIG. 4 is a plan view of the same magnetic head.

Referring to FIG. 1, there is shown a conventional combined magnetic head which comprises a magnetic record-reproduce head core 1 having a coil wound thereon to form a closed magnetic circuit, and an erase head core 3 disposed on the opposite sides of the record-reproduce head core 1 with a non-magnetic spacer member 2 interposed between the core 3 and the core 1, the erase head core 3 having coils 4 wound thereon and having gaps 6 disposed perpendicularly to the gap 5 of the record-reproduce head core.

The erase head core 3 is formed of a magnetic metal and substantially U-shaped so as to embrace the record-reproduce head core 1. As shown, the erase head core 3 must be of a small thickness sufficient to eliminate any undersirable leadage flux from the ends thereof. However, using a magnetic metal to form an erase head in such a shape has encountered difficulties in machining the metal. This in turn has led to limitations in arranging the erase head core of magnetic metal in such a manner that the effective magnetic flux thereof is orthogonal to the magnetic record-reproduce flux so as to prevent any mutual interference between these different magnetic fluxes, and such a magnetic head has been disadvantageous to effectively achieve highly dense magnetic records.

FIGS. 2 to 6 show an embodiment of the cross type magnetic head for high-density recording according to the present invention. The magnetic record or record-reproduce head, generally indicated by reference numeral 10, comprises a pair of record or record-reproduce head core halves 11 and 12, which are disposed in side-to-side abutment and joined together by means of moten glass 13, 14 filling the interface 60 between the core halves so as to provide an operating gap 15 which acts as record or record-reproduce gap. The magnetic head core halves 11 and 12 may be formed of a single-crystalline magnetic material having magnetic anisotropy such as single-drystalline ferrite, single-crystalline sendust, single-crystalline ferroplana or the like; or polycrystalline ferrite of high density, hot-pressed ferrite, polycrystalline sendust, polycrystalline ferroplana or the like; or other metallic or non-metallic magnetic material. Where a single-crystalline magnetic material of magnetic anisotropy is particularly used for the core halves 11 and 12, the material should desirably be cut in a predetermined crystalline orientation as will further be described. A coil 16 is wound around a window provided by the pair of record or record-reproduce core halves 11 and 12.

Figures 5A, 5B, 5C:
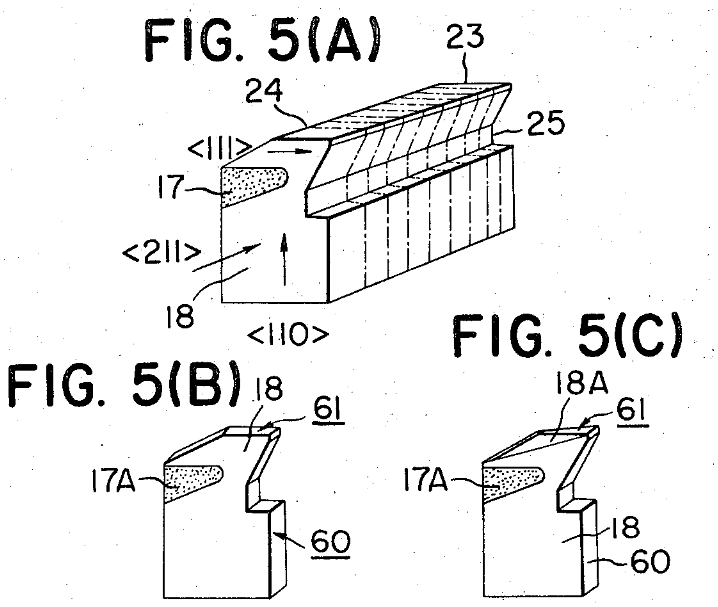
FIGS. 5A, B and C illustrate the process of making an erase head core for use in the magnetic head of the present invention.
Figure 6:
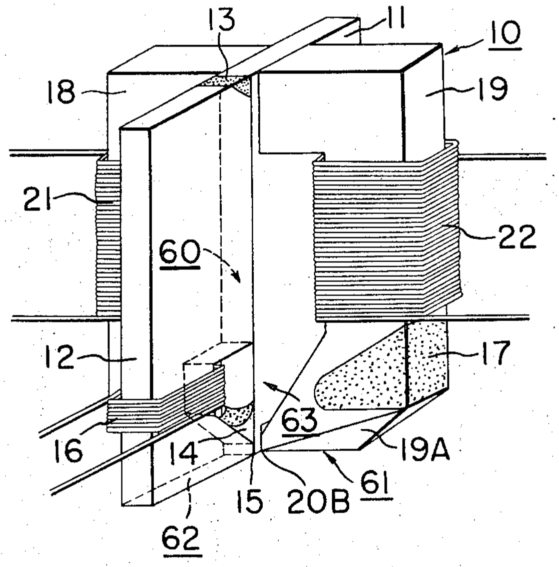
FIG. 6 shows, in perspective view, the cross type magnetic head of FIGS. 2 to 4.

A pair of erase head core halves 18 and 9 should preferably be formed of a single-crystalline magnetic material having magnetic anisotropy, in the manner described hereunder. As shown in FIG. 5A, a core block 23 which has been cut from a crystal axis is initially machined to provide a sloped surface 24 and a groove 25, which provides the window to be wrapped with a coil. Along the side of the core block 23 which is opposite to that side formed with the groove 25, a wedge-shaped groove is further formed and filled with a glass filler 17. Subsequently, such a core block is transversely cut into pieces, one of which is shown in FIG. 5B. A piece thus provided is machined to form wedge-shaped surface portions 18A or 19A, which reduces the area of a surface 61 which is adapted for contact with a magnetic recording medium (not shown). Thus, there is obtained the erase head core half 18 as shown in FIG. 5C. Another piece will likewise provide the other core half 19. The material formining such erase head core may preferably be single-crystalline ferrite, single-crystalline sendust, single-crystalline ferroplana or the like having magnetic anisotropy. As shown, the erase head core halves 18 and 19 are securely bonded to the core half 11 at the opposite sides thereof and in the vicinity of the record or record-reproduce gap 15 so as to form the magnetic path of the erase head. In other words, the erase head core halves 18 and 19 are fixed substantially orthogonally to the core half 11 at the opposite side portions 63 which are adjacent both to the interface 60 forming the gap 15 and to a surface 62 of the magnetic record or record-reproduce head core which is adapted for contact with the magnetic recording medium. When these erase head core halves 18 and 19 are bonded to the core half 11, a non-magnetic spacer material such as berylium bronze is disposed on the opposite side portions 63 of the core half 11 so as to provide a pair of erase head gaps 20A and 20B between the erase head core halves 18, 19 and the record-reproduce core half 11. A pair of coils 21 and 22 are wound on the erase head core halves 18 and 19, respectively, and these coils are serially connected together.

The magnetic record or record-reproduce head 10 thus constructed is such that a pair of erase head gaps 20A and 20B are provided by a pair of erase head core halves 18 and 19, with the gap 15 of the head 10 interposed between the erase head gaps and with the record or record-reproduce core half 11 interposed between the erase head core halves. Thus, the main gap 15 intended for recording or recording-reproducing operation and the erase gaps 20A, 20B are in orthogonal relationship with each other. The cross type magnetic head for high-density recording thus constructed according to the pressent invention is generally shown in a perspective view of FIG. 6, wherein like numerals correspond to those used in FIGS. 2 to 4.

Figures 8, 9, 10:
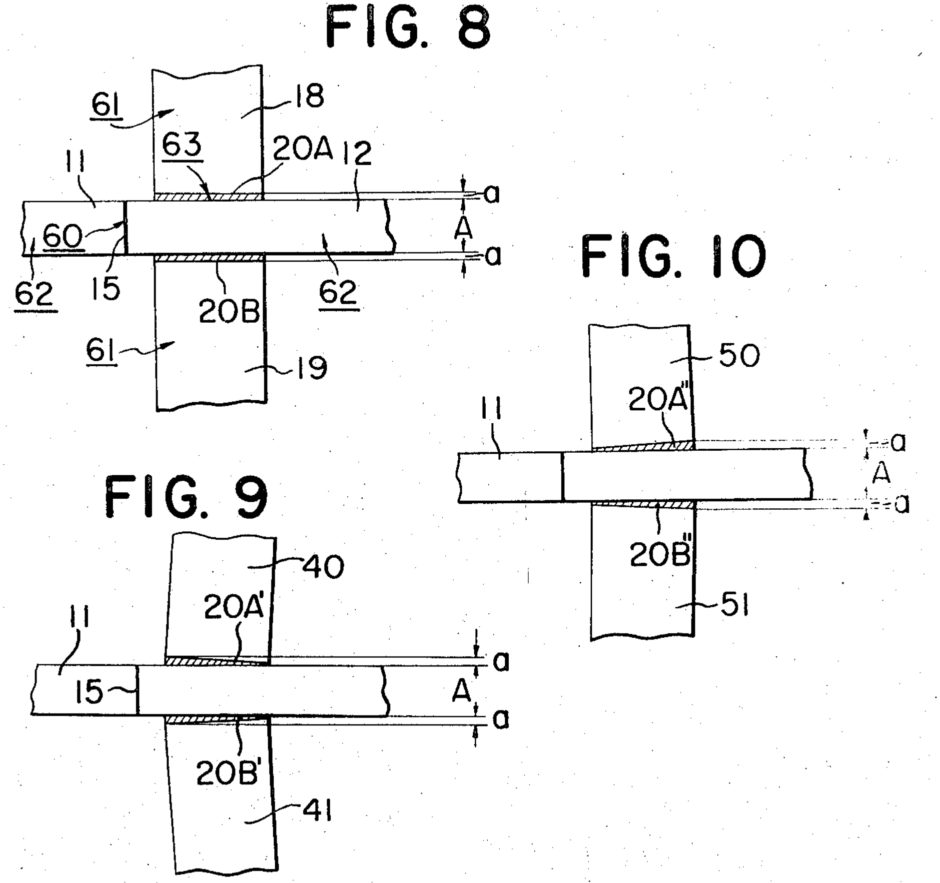
FIG. 8 is an enlarged view of the gap portion of the magnetic head shown in FIG. 4.
FIGS. 9 and 10 are enlarged views of modifications of the gap portion.

In the illustrated embodiment, the length of each erase gap and the thickness of the erase core may preferably be greater (for example, two to four times greater) than the length of the record or record-produce gap (i.e. the length corresponding to the width of the magnetized track shown in FIG. 8) and the thickness of the record or record-reproduce head core, respectively. This will facilitate to enhance the accuracy with which the erase core is mounted on the magnetic record or record-reproduce head core, and also reduce the wear of the erase gaps which may result from the sliding contact between the erase head and the magnetic recording medium, as well as improve the erasing characteristic of the erase gaps tapered as will be described later.

Description will now be made of the manner in which each core member 11, 12, 18, 19 is cut in a predetermined crystal orientation from a single-crystalline magnetic material of magnetic anisotropy which is preferable as the magnetic material used for the magnetic head for high-density recording according to the present invention.

Among the previously enumerated single-crystalline magnetic materials of magnetic anisotropy, single-crystalline ferrite and single-crystalline sendust both have a cubic crystal structure, whose crystal axes are easier to magnetize in the order named below.

Single-crystalline ferrite: axis [111], axis [211], axis [110] and axis [100]. In case of single-crystalline sendust, which differs in symbol of magnetic anisotropy constant from single-crystalline ferrite, the order of ease of magnetization is reversed: axis [100], axis [110], axis [211] and axis [111]. In case of single-crystalline ferroplana, which is of hexagonal crystal structure and whose crystal axes are normally represented by *a*, *b*, *c* and *d*, the axis *c* is only magnetizable and the other axes are difficult to magnetize.

The manner of cutting a core will be described by first taking as an example the single-crystalline ferrite among the foregoing three types of material. Record or record-reproduce core halves 11 or 12 is cut off so that axis [110] is parallel to the interface of the core, that the surface intersecting the gap 15 extends along the axis [111] which is more readily magnetizable than the axis [110] and that the thickness of the core extends along the axis [211], as indicated by arrows in FIGS. 2 and 4. By doing so, the two core halves 11 and 12 when brought into abutment, can provide a magnetic path formed by two readily magnetizable axes, i.e. axes [111] and [110].

The directions in which the erase head core halves 18 and 19 are cut off are indicated by arrows in FIGS. 3 and 5A which represent the respective crystal orientations. As shown in FIG. 5A, the core block 23 of single-crystalline ferrite is cut off so that the axis [110] is parallel to the interface between the core halves 18, 19 and the core 11, that the axis [111] intersects the gaps 20A and 20B, that the thickness of the core extends along the axis [211], and finally that the axes [110] and [111] form the magnetic path of the erase core.

If the core member 11, 12, 18, 19 is to be cut from single-crystalline sendust, whose magnetizable axes are reverse to those of single-crystalline ferrite, the directions of cutting should accordingly be reverse to the case of the latter material, and finally these core members must be cut so that the axes [211] and [100] form the magnetic paths of the record or record-reproduce head and the erase head, respectively.

In case of single-crystalline ferroplana, the readily magnetizable axis *c* is selected as the direction intersecting the gap 15 and the other direction can be suitably selected from among the other axes.

Where the record or record-reproduce head is formed of any other magnetic material than the foregoing single-crystalline magnetic materials, it is again desirable that any magnetizable axis in the material be selected as the direction intersecting the gap 15. Although the record or record-reproduce head core and the erase head core have been described as being formed of the same type of magnetic material, they may of course be formed of different types of mgnetic material.

Figure 7:
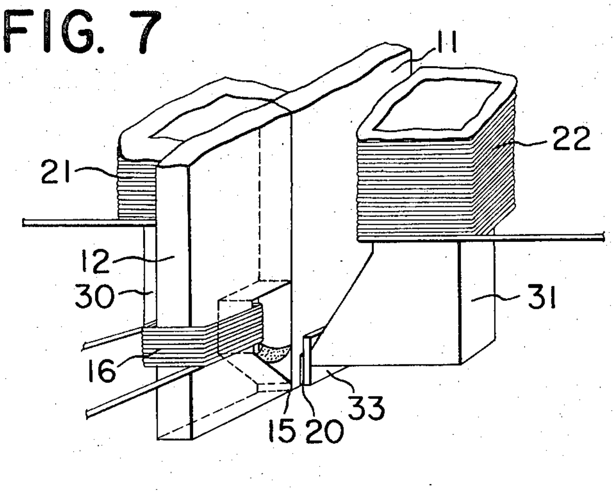
FIG. 7 is a perspective view of another embodiment of the cross type magnetic head according to the present invention, showing a modified part thereof as compared with the embodiment of FIG. 6.

Referring to FIG. 7, there is shown another embodiment of the cross type magnetic head in which the erase head core is particularly modified. As shown, the erase core is divided into two steps. More specifically, a first pair of erase core tips 33 having a non-magnetic spacer material 20 held directly therebetween and a second pair of erase core halves 30 and 31 carrying thereon the first pair of erase tips and having coils wound thereon are fixed to the head core half 11 in the vicinity of the record or record-reproduce gap 15. An increased surface area of the erase head core adapted for contact with the magnetic recording medium may result in undesirable leakage flux, and in order to reduce such leakage flux and provide a stable erasing characteristic, the second pair of erase head core halves 30 and 31 should preferably be spaced apart 0.05 to 0.1 mm from the surfaces of the record-reproduce core halves 11, 12 adapted for contact with the magnetic recording medium and from the surfaces of the first erase tips 33 adapted for contact with the recording medium.

Referring to FIG. 8, description will now be made of recording certain data or information on a magnetic recording medium (not shown) with which the above-described magnetic head is brought into contact. When the magnetic head is brought into contact with the magnetic recording medium and a recording current is passed to the coil 16, a magnetic record is effected on the recording medium by a record flux produced by the gap 15, over the width A of the magnetized track as shown in FIG. 8. Actually, however, the width of the magnetized track is made greater than the width A by leakage record flux at the opposite ends of the gap 15. The magnetized track so formed is subjected to an erasing action by a pair of erase gaps formed between the core 11 and the erase core halves 18, 19 or core tips 33, whereby the leakage flux at the opposite ends of the gap 15 in excess of the magnetized track width A is erased to provide a recorded track of data having a width exactly equal to the width A. The outer portions of the magnetized track beyond the width A are subjected to an erasing action so that two blank tracks *a*, *a* corresponding to the pair of erase gaps are formed along the opposite side edges of the recorded track A.

Therefore, when the magnetic recording medium which may be in the form of disc, for example, has made one full rotation and the magnetic head is displaced to a subsequent track, any noise which may result from any positional error of the magnetic head can be removed without fail by the two blank tracks formed along the opposite side edges of the magnetized recorded track, thereby ensuring magnetized tracks of a predetermined width and blank tracks of a predetermined width to be formed successively in parallel relationship on the magnetic recording medium.

Since the width of each erase gap may be varied as desired by suitably selecting the thickness of the spacer, the blank tracks may be formed with any desired small width and thus highly dense records can be provided on the magnetic recording medium. Signals thus recorded on the magnetic recording medium may be reproduced simply by causing the record-reproduce head to trace the successive magnetized tracks.

If the magnetic head is constructed such that the allowable error of the relative position between the magnetic head and the magnetic recording medium is within the range of the width of the blank track, any positional error of the magnetic head would only cause it to trace the blank track so that the magnetic head can reproduce the record on the magnetized track without picking up any noise which may be present in the regions other than a particular magnetized track on the magnetic recording medium.

The blank tracks may be utilized as the head position control signal to provide a very high density recording-reproducing system.

FIG. 9 shows a modification of the erase head in which a pair of erase head gaps 20A′ and 20B′ are provided with spacers tapered so that these erase head gaps are gradually reduced in width as they progress away from the record-reproduce gap 15 or in the tracking direction.

FIG. 10 shows a further modification of the erase head in which the erase gaps 20A″ and 20B″ are tapered in the opposite direction to those shown in FIG. 9.

The erase gap arrangement as shown in FIG. 9 enables the distribution of the erase field to be progressively increased during a magnetic recording cycle so that any residual magnetism resulting from the recording can be magnetized to a saturating point, thereby enabling DC erasing.

In contrast, the erase gap arrangement as shown in FIG. 10 enables the distribution of the erase field to be progressively decreased during a magnetic recording cycle so that the residual magnetism can be nullified to enable AC erasing.

In the magnetic head as shown in FIGS. 2 to 6, the glass fillers 17 in the erase head core halves 18 and 19 serve to increase the magnetic resistance of the core itself and thus, the core per se can considerably reduce the leakage flux produced in the other regions than the gaps.

Also, the fact that the front end faces 18A and 19A of the erase head core halves are cut away in wedge-like shape except the erase gap forming surfaces enables the leakage flux from these end faces 18A and 19A to be reduced substantially to a negligible extent. As the result, the information recording on the magnetic recording medium can be effected by the use of such magnetic head without the possibility that any unnecessary noise flux may leak from any other regions than the gaps provided by the erase head cores 18 and 19 and by the cores 11 and 12 and may undesirably be recorded on the magnetic recording medium.

Further, the two-step formation of the erase core as shown in FIG. 7 is useful to reduce the surface area of the erase core for contact with the magnetic recording medium, which in turn results in removal of undesirable leakage flux and accordingly effective prevention of adverse effects such as inadvertent erasing of other unrelated tracks.

Furthermore, the magnetic path of the magnetic record or record-reproduce head core being provided by readily magnetizable crystal axes is useful to substantially eliminate the mutual magnetic interference between the record head and the erase head, thus preventing any noise from mixing with the magnetic record head.

According to the present invention, as has been described hitherto, an erase head core having fillers of high magnetic resistance embedded therein is disposed orthogonally and fixed to a magnetic record or record-reproduce head in the upper and lower portions thereof so that narrow blank tracks are formed along the opposite side edges of the recorded track provided by the record head. Such construction eliminates any noise which might result from the leakage flux of the magnetic head and not only ensures magnetized tracks of an exact effective width to be provided on a magnetic recording medium but also enables noiseless reproduction to be accomplished irrespective of any error in the relative position between the magnetic head and the magnetic recording medium. These advantages, as well as the ease to manufacture the above-described simple magnetic head, are very useful for the high-density information recording and reproducing.

I claim:

1. A cross-type magnetic head for decreasing a recording track width comprising:

a first plate-shaped core consisting of magnetic material and having a first side edge, a front face and a back face, a second plate-shaped core consisting of magnetic material and having a first side edge, a front face and a back face, said first side edge having a recess extending from one end thereof, a record or record-reproduce coil wound around said second plate-shaped core and extending through said recess, said first side edges being fixed together in abutting relationship to form a record or record-reproduce head with their interface forming a record or record reproduce gap at said one end of said second plate-shaped core, a first erase core having two end portions and being disposed substantially perpendicular to the plane of said plate-shaped cores, one of said end portions forming a first erase gap with the front face of said first plate-shaped core adjacent said record or record-reproduce gap, and the other end portion being bonded to the front face of said first plate-shaped core adjacent its first side edge, a first erase coil wound around a portion of said first erase core between said two end portions, a second erase core having two end portions and being disposed substantially perpendicular to the plane of said plate-shaped cores, one of said end portions forming a second erase gap with the back face of said first plate-shaped core adjacent said record or record-reproduce gap, and the other end portion being bonded to the back face of said first plate-shaped core adjacent its first side edge, whereby said erase gaps are in opposed relationship with respect to each other, a second erase coil wound around a portion of said second erase core between said two end portions.

2. A cross-type magnetic head as defined in claim 1, wherein said first and second erase cores have fillers of high magnetic resistance embedded therein.

3. A cross type magnetic head as defined in claim 1, wherein end faces of said first and second erase cores which are adapted for contact with magnetic recording medium have wedge-shaped recesses extending in a direction away from said erase gaps respectively, thereby to substantially reduce undesirable leakage flux from said end faces.

4. A cross-type magnetic head defined in claim 1, wherein a first erase core tip is disposed between said one end portion of said first erase core and said front face of said first plate-shaped core to form said first erase gap, and a second erase core tip disposed between said one end portion of said second erase core and said back face of said first plate-shaped core to form said second erase gap.

5. A cross-type magnetic head defined in claim 1, wherein the length of said record or record reproducing gap is less than the length of said first and second erase gaps.

6. A cross-type magnetic head defined in claim 1, wherein the width of said first erase gap formed between said first erase core and said first plate-shaped core gradually varies in the tracing direction of said cross-type magnetic head.

7. A cross-type magnetic head defined in claim 6, wherein the width of said first erase gap gradually decreases in the tracing direction of said cross-type magnetic head.

8. A cross-type magnetic head defined in claim 6, wherein the width of said first erase gap gradually increases in the tracing direction of said cross-type magnetic head.

* * * * *